Figure 1:
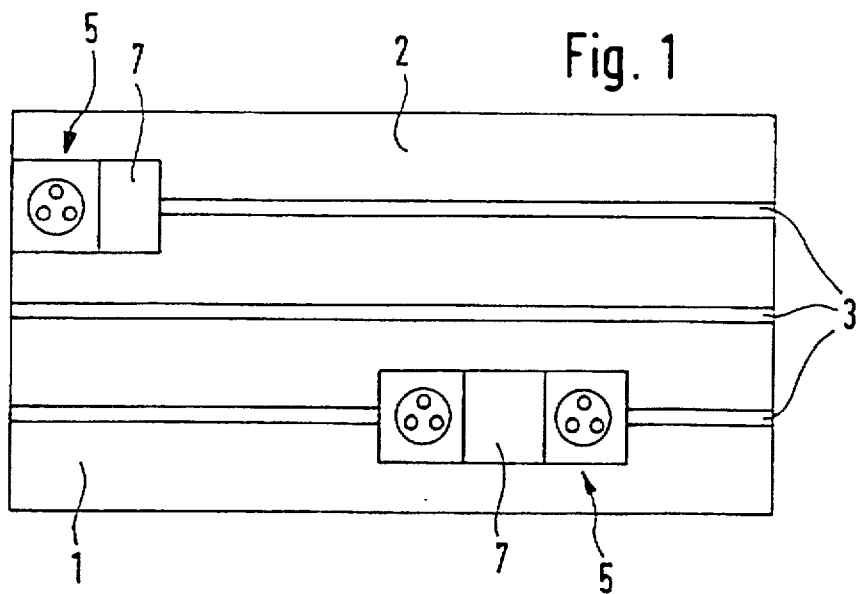

United States Patent [19]
Sigel

[11] Patent Number: 5,794,901
[45] Date of Patent: Aug. 18, 1998

[54] FUNCTIONAL COMPONENT USABLE FOR DEMONSTRATION AND/OR TRAINING PURPOSES

[75] Inventor: Albert Sigel, Weilheim, Germany

[73] Assignee: Festo KG, Esslingen, Germany

[21] Appl. No.: 505,316

[22] PCT Filed: Jan. 20, 1994

[86] PCT No.: PCT/EP94/00131

§ 371 Date: Aug. 17, 1995

§ 102(e) Date: Aug. 17, 1995

[87] PCT Pub. No.: WO94/19787

PCT Pub. Date: Sep. 1, 1994

[30] Foreign Application Priority Data

Feb. 18, 1993 [DE] Germany .................. 9302385 U

[51] Int. Cl.⁶ .................................................. A47B 96/06
[52] U.S. Cl. ............. 248/221.11; 248/207; 248/222.52; 248/223.41; 411/85; 411/551
[58] Field of Search .................. 248/221.11, 222.13, 248/222.14, 222.52, 223.41, 207, 245, 292.12; 211/94; 411/84, 85, 551, 553

[56] References Cited

U.S. PATENT DOCUMENTS

| | | | |
|---|---|---|---|
| 3,415,477 | 12/1968 | Kondur, Jr. ................ | 248/223.41 |
| 4,222,508 | 9/1980 | Bott ................ | 248/222.52 X |
| 4,602,756 | 7/1986 | Chatfield ................ | 248/222.14 X |
| 4,650,425 | 3/1987 | McGarry . | |
| 4,677,794 | 7/1987 | Parron et al. ................ | 248/222.14 X |
| 4,826,438 | 5/1989 | Torres . | |
| 4,852,839 | 8/1989 | Winter et al. ................ | 248/222.14 X |
| 5,076,748 | 12/1991 | Waterfield et al. ................ | 411/84 X |
| 5,199,836 | 4/1993 | Gogarty ................ | 411/84 |
| 5,209,619 | 5/1993 | Rinderer ................ | 411/553 X |
| 5,498,097 | 3/1996 | Shapess ................ | 248/222.14 X |

FOREIGN PATENT DOCUMENTS

| | | |
|---|---|---|
| 0 522 633 A3 | 1/1993 | European Pat. Off. . |
| 91 15 943 | 2/1992 | Germany . |
| 1 599 743 | 10/1981 | United Kingdom . |
| 2 151 387 | 7/1985 | United Kingdom . |
| 2 176 661 | 12/1986 | United Kingdom . |

OTHER PUBLICATIONS

"Self-Retaining or Removable Spacer for Transistor Outline Component Package", *IBM Technical Disclosure Bulletin*, vol. 32, No. 3B (Aug. 1989).

*Primary Examiner*—Leslie A. Braun
*Assistant Examiner*—Derek J. Berger
*Attorney, Agent, or Firm*—Hoffmann & Baron, LLP

[57] ABSTRACT

Functional component usable for demonstration and/or training purposes which can be releasably secured to the mounting face of a support base (1). It is provided with a clamping device (8) which is brought into engagement with a mounting recess (3) of support base (1), which is activated by rotating an actuating element (12). A downwardly extending clamping head (18) is mounted on the actuating element which is insertable into the mounting recess (3) and which can be positioned by rotating in such a manner that it engages behind two retaining protrusions in the mounting recess (3). By a further rotation of the actuating element, the functional element is clamped against the surface of the support base (1).

9 Claims, 2 Drawing Sheets

1

FUNCTIONAL COMPONENT USABLE FOR DEMONSTRATION AND/OR TRAINING PURPOSES

The invention relates to a functional component usable for demonstration and/or training purposes in accordance with the preamble of claim 1.

In order to facilitate the understanding of individual structural elements or complete circuits it is customary, in particular, in the fields of pneumatic, hydraulic and electronic to provide practical sets. In the case of the device of the aforementioned type known from DE-GM 75 07 762 a plate-like support is used which has a multitude of bores in a screen into which the individual functional elements can be plugged. Each functional element is provided with a pneumatic, hydraulic, electric or electronic equipment, for example, valves, operating cylinders, manometers, connecting sleeves for electric or pneumatic lines, electronic controls, etc. The functional elements may be mounted in accordance with a circuit diagram and subsequently connected with each other in the required manner either fluidically and/or electrically.

In devices of the aforement type as described in DE-U-9115943 or U.S. Pat. No. 4,650,425, the mounting of the functional elements is performed on plate-like supports which are equipped with mounting recesses. A clamping element formed from a sliding block is inserted into a mounting recess and rotated to the abutment, so that during the subsequent further rotation, a clamp operation is triggered along with the cooperating thread part.

During the mounting of a functional element on the support, it is required to hold the functional element with one hand in the desired position until the clamping operation is completed. This is true in particular with oblique installed supports. If the functional elements are subjected to dynamic stress during operation, it is possible that the clamping force is somewhat diminished so that the functional element moves out of place.

It is an object of the subject invention to provide a functional element of the aforementioned type permitting a more flexible structure of devices to be demonstrated, providing a simple handling and an improved mounting security even during dynamic stress.

This object is solved by the characterizing features of claim 1.

The functional element is so designed that it can be releasably mounted on a support which is provided with at least one groove-like recess. Supports of this type are known, for example, from DE-OS 40 10 840. It may consist of an extrusion pressed plate-like material which is provided with a multitude of linear mounting recesses extending parallel with a distance to each other, whereby the functional element can be releasably anchored in a given available mounting recess. As a mounting device of the inventive functional element, a clamping device is provided which has a downwardly directed protruding clamping element which, in the mounted position of the functional element, engages into the selected mounting recess. In its locked position, the clamping element engages behind a retaining protrusion of the mounting recess with its clamping head, so that a release of the functional element from the mounting face is prevented. The firm mounting is obtained in that the clamping head is pretensioned against the retaining protrusion by maintaining its locked position. The actuation of the mechanism with respect to locking and releasing is executed in a simple manner by a mere rotating of an actuating element which is connected with the clamping element by means of a thread connection. Generally, a tool is not required, because the force of the human hand is sufficient for actuating the device. It is of particular advantage that the functional element can be arranged and clamped stepless at any given position along the given mounting recess. That at least one centering element, which immerses into the associated mounting recess in the mounted position, contributes to the accurate positioning of the functional element with respect to the support. It prevents a sliding out of place of the functional element so that even during a dynamic stress, a secure mounting is always assured on the support. With the inventive functional elements, complex circuits may be installed in a very compact and space saving manner.

Advantageous further embodiments of the invention are stated in the subclaims.

A so-called T-head bolt is advantageously used as the clamping element, which is commercially available. The head forms the clamping head.

The invention will be explained in more detail in the following description read in conjunction with the appended drawings. The drawings show:

FIG. 1 in particular a plate-like support with a view on the mounting face on which two functional elements are mounted.

Figure 2:
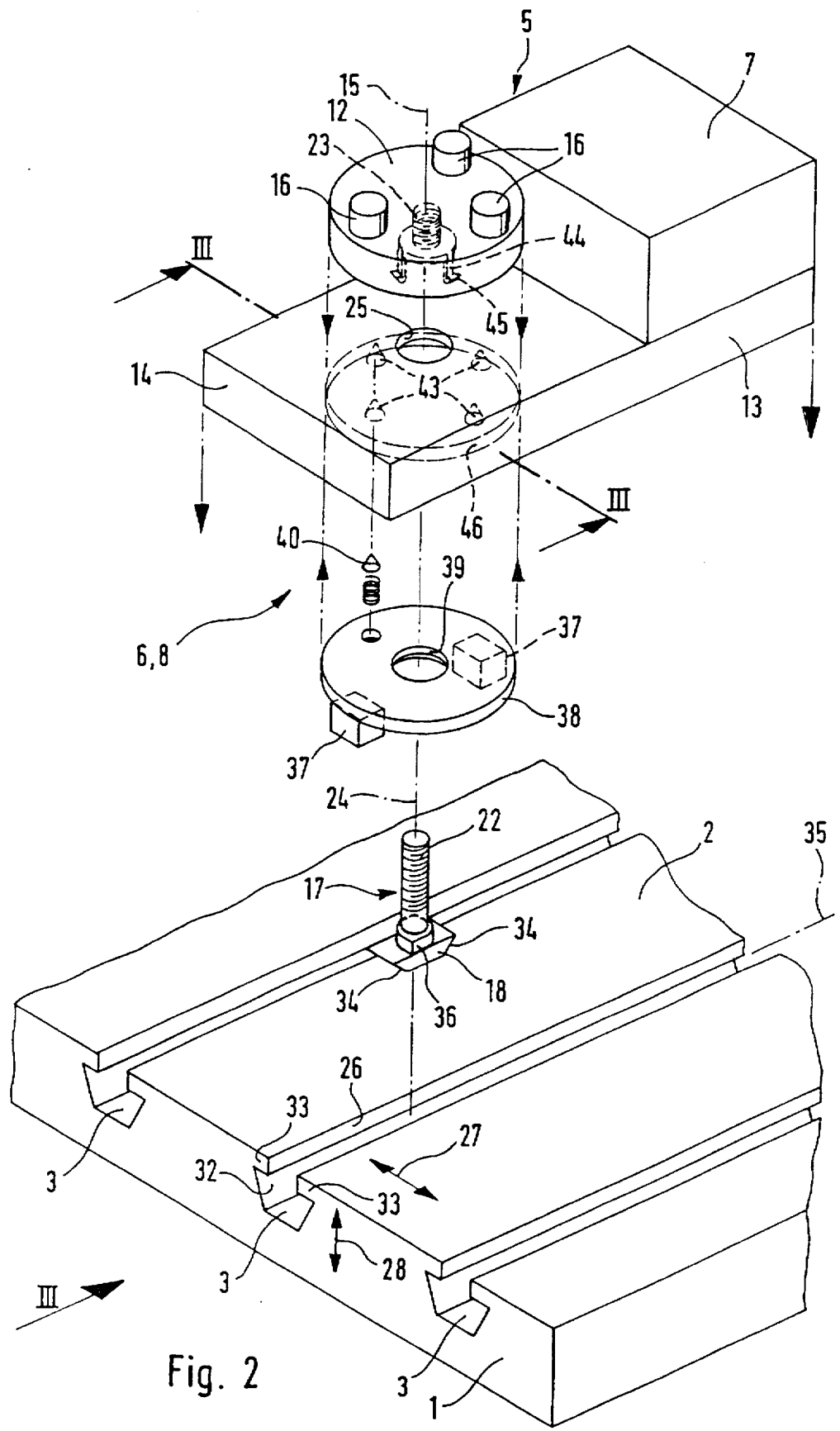

FIG. 2 a perspective exploded illustration of a preferred embodiment of the functional element.

Figure 3:
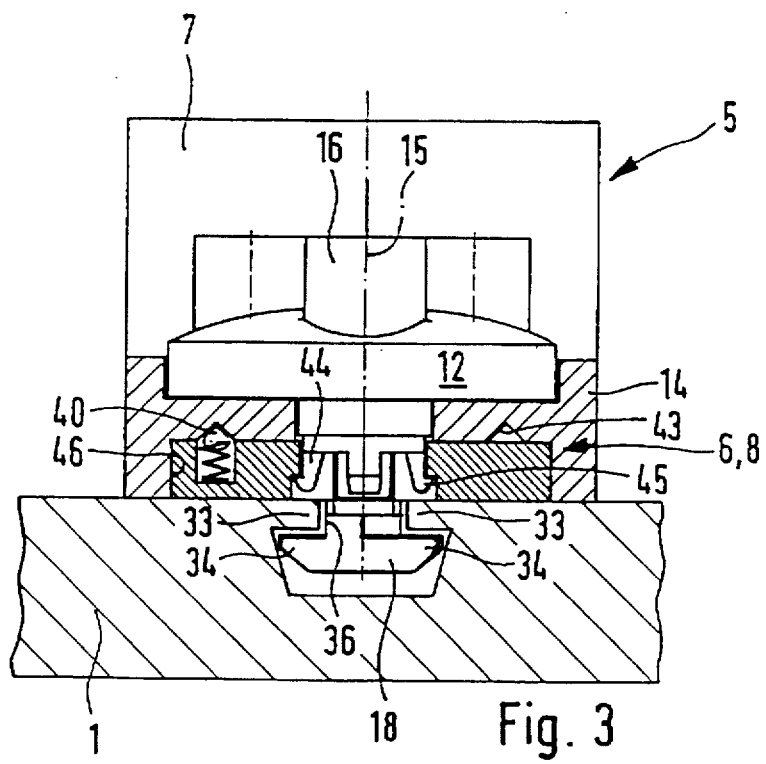

FIG. 3 a cross section through the functional element from FIG. 2 in accordance with the sectional line III—III of the functional element attached on the support in the mounted position, whereby the clamp head assumes a locked position preventing a lifting from the support.

The figures show a preferably plate-like shaped support base 1, whose one larger face forms a substantially flat mounting face 2. A multitude of groove-like mounting recesses 3 are formed in the support base 1 extending substantially in a linear direction and are spaced apart at a distance from each other. The mounting recesses 3 are longitudinally open with respect to mounting face 2. Preferably they also discharge at two opposite front faces of the support base 1, so that the latter may be an extruded profile part.

Functional elements 5 can be mounted on mounting face 2 which can be releasably anchored in one or a multitude of mounting recesses 3 by means of a mounting device 6, which is illustrated in detail in FIGS. 2 and 3. The functional elements 5 are equipped with functional units 7, which are not illustrated in detail, and which are, in particular, of the pneumatic and/or hydraulic and/or electric and/or electronic and/or optic type. For example, they could be individual devices or combinations of valves, operating cylinders, electronic controls, manometers, connecting sleeves for electric or fluid lines etc. The functional elements 5, which are mounted on mounting face 2, may be connected with each other (not shown), so that circuits may be copied therefrom so as to provide a practical understanding aid for teaching purposes. One can also build complete miniature machines or plants, so as to obtain the best possible arrangement or connection before a corresponding plant is designed in reality.

The arrangement of the functional elements 5 on support base 1 is very flexible, since they can be releasably mounted anywhere along the mounting recesses 3. Hence, one is not limited to defined screen measurements.

The mounting device 6 is a clamp 8 which can be actuated by rotating an actuator 12. The preferred structure of such a clamping means 8 is illustrated in FIGS. 2 and 3.

The illustrated functional element 5 has a base body 13 which supports the mentioned functional unit 7. The latter may be exchangeably mounted on base body 13. The clamp 8 is supported by the base body 13 and is located preferably in the area of a plate-like segment 14 of the same. All components of the clamp 8 are always arranged on functional element 5, so that they are immediately available when needed. Therefore, a separation of individual components of the clamp 8 from functional element 5 during its assembly or disassembly on or from support base 1 is not required.

The actuating element 12 is formed as a rotating part which is mounted rotatably on the upper face of base body 13. The rotating axis 15 advantageously extends parallel to the vertical axis of the functional element 5 and at a right angle with respect to the mounting face 2 seen in the mounted position. Preferably, the actuating element 12 has a disk-like shape, whose longitudinal axis coincides with the rotating axis 15. A multitude of handling protrusions 16 may be provided and distributed in circumferential direction on its upper surface and which are separated by interstitial spaces. They are very suitable for engagement by the human hand for creating a rotation. The interstitial spaces permit the engaging of a rod-like lever if high torques are required.

A clamp element 17 is provided as a further component of clamping device 8. It is located at the area of the lower face of base body 13 and is connected with the actuating element 12 by means of a thread connection. A clamp head 18 is provided on the lower extending end which is displaced through the thread connection during a relative rotating between the actuating element 12 and the clamp element 17 in a vertical direction, so that the distance between the same and the base body 13 is changed. The actuating element 12 cannot be adjusted vertically with respect to base body 13.

The clamping element 17 preferably has a shaft-like first thread segment 22 extending upwardly and a second thread segment 23 provided on actuating element 12 being in engagement with the first thread segment. By way of example, the second thread segment 23 is an inner thread into which the first thread segment 22, which has an outer thread, is screwed into it, whereby the common longitudinal axis 24 of thread segments 22, 23 coincides with rotating axis 15 of actuating element 12. The connection between the actuating element 12 and clamping element 17 is made possible by a coaxially provided aperture 25 of base body 13.

In the mounted position of the functional element 5 on support base 1, the clamping head 18 is anchored in the associated mounting recess 3. The longitudinal opening of the same facing the mounting face 2 is formed by a neck segment 26, which, in the cross section 27, is smaller than a mounting segment 32 which is subsequent thereto extending in a heightwise and depthwise direction 26 toward the grooved bottom and is deeper than the neck segment 26. In this manner, at least one retaining projection 33 is present in the transition area between the neck segment 26 and the mounting segment 32, whereby in the exemplified embodiment, two such protrusions 33 are provided because of symmetric arrangement of neck segment 26 and mounting segment 32 which are in the area of the two recess flanks and which continuously extend over the total face of the given mounting recess 3.

The clamping head 18 is shaped in such a manner that in a defined rotation position, shown in FIG. 2, in the following called the released position, it is located at a right angle with respect to the mounting face 2 and is therefore insertable and removable in height and depth direction into a given mounting recess 3. In the inserted condition in a mounting recess 3, the clamping element 17 can be turned around its longitudinal axis 24 in such a manner that the clamping head 18 assumes a locked position as illustrated in FIG. 3, so that it engages behind at least one and preferably both retaining protrusions 33 at the side facing the recess bottom. In this position a removal of the clamping head 8 from the mounting recess 3 in a heightwise or depthwise direction 28 is not possible because of the positive cooperation with the retaining protrusions 33.

In order to enable a corresponding handling, the clamping head 18 has a transverse extension, for example, which is less than the recess width in neck segment 26, so that the clamping head 18 in the released position fits through the neck segment 26. At least one anchoring protrusion 34 of clamping head 8 extends at a right angle, whereby the same is directed radially with respect to longitudinal axis 24. In the released position the anchoring protrusion 34 is in the longitudinal direction 35 of the associated mounting recess 3. The clamping head 18 of the exemplified embodiment has two such anchoring protrusions 34 which are diametrically opposed with respect to the longitudinal axis. In the locked position, in accordance with FIG. 3, the anchoring protrusions 34 are positioned beneath each of retaining protrusions 33. The upwardly extending first thread segment 22 of the clamping element subsequent to clamping head 18 is so small at its measured thickness along the height and depth direction 28 of retaining protrusions 33 that it fits without any problems through the neck segment 26.

It is advantageous to use a commercially available standard T-head bolt as the clamping element 17, whose head forms the clamping head 18, its shaft, and the first thread segment 22. This is also true for the exemplified embodiment.

The thread engagement between the clamping element 17 and the actuating element is selected in such a manner in the exemplified embodiment that a direct rotational co-movement is assured between the two parts, as long as the clamping element 17 is not prevented from a rotating movement by means of alien means. This is obtained by means of a sufficient high thread friction in the area of the engaged thread segments 22, 23. In order to realize this, a multitude of methods are available, for example, a different selection of material, different pitches, different thread depths, etc. One also could provide a suitable drag coating on at least one of the thread segments 22, 23. Therefore, before assembly of the functional element 5, the co-moving clamping head 18 can be positioned into the released position by rotating the actuating element 12. During the subsequent mounting of the functional element 5 on the mounting face 2, the clamping head 18 then immerses unobstructed into the mounting segment 32 of the elected mounting recess 3.

If the actuating element 12 is subsequently rotated again, then the clamping head 18 rotates until the anchoring protrusions 34 are positioned beneath the retaining protrusions so that the locking position is reached in accordance with FIG. 3. A further rotation of the clamping head 18 beyond this locking position is not possible, since at least one rotating limiting means 36 is provided on the clamping element 17 which blocks the clamping head 18 in co-action with support base 1 in the locked position against a further rotation.

By way of example, the rotation limiting means 36 cooperates with the recess flank in neck segment 26. It is shaped as a radially outwardly extending projection of the clamping element which, in the released position, is mounted in the area between the two recess flanks in neck segment 26 and, when reaching the locked position, engages the recess flank. Preferably, subsequent to the clamping head 18 and the first thread segment 22, there is a ring-like shoulder mounted coaxially with respect to longitudinal axis 24, whose outer cross section corresponds to about the width of neck segment 26 and which is widened by a protrusion forming a rotating limiting means 36. In the exemplified embodiment, two such rotating limiting means 36 are provided which are positioned diametrically with respect to each other. T-head bolts, used as clamping elements 17 in the exemplified embodiment, customarily already have a corresponding formed shoulder, so that no particular adaptation operations are required when used as a clamping element 17 thus reducing the manufacturing costs.

The clamping head 18, which is turned into the locked position, at first assumes a released position whereby its anchoring protrusions 34 are positioned with a distance below retaining protrusions 33, or only slightly touch the same. When the actuating element 12 is rotated clockwise, in the following called clamping rotation, the thread drag is overcome and the second thread segment 23 of the actuating element 12 is rotated relative to the resting first thread segment 22 of the clamping element 17. This results in that the clamping head 18 is moved in the direction of the longitudinal axis 24 toward the actuating element 12, since the first thread segment 22 screws into the second thread segment 23. Thereby, the clamping head 18, with retaining protrusions 33, displaces upwardly in the direction to the retaining protrusions 33 and is pushed against the same, whereby simultaneously the base body 13 is pushed against the mounting face 2. Corresponding to the torque exerted on the actuating element 12, a more or less large clamping force is created. In comparison to the released position, the rotating position of the clamping head 18 has not changed, but now it assumes a pretensioned clamping position against the retaining protrusions 33.

The functional element 5 is now securely mounted on the support base 1 and is securely held thereon when a dynamic stress is admitted.

For disassembly of functional element 5, the actuating element 12 is moved counterclockwise with respect to the clamping direction into the release mode, so that the clamping head 18 is displaced into the released position in a direction of longitudinal axis 24. A co-rotating of the clamping head 18 is prevented by the initial positive locking between the clamping head 18 and the retaining protrusions 33. Also, an additional positive locking may be effective, in that the upper face of the anchoring protrusions 34 facing the retaining protrusions 33 are equipped with one or a multitude of elevations which are impressed into the retaining protrusions 34 in the clamping position. However, as soon as the thread drag between the two thread segments 22, 23 is larger than the retaining force between the anchoring protrusions 34 and the retaining protrusions 33, the clamping head 18 rotates back together with actuating element 12. As soon as the release position is again obtained, the functional element 5 can be removed from support base 1. It is advantageous if a rotating limiting means 36 is provided which prevents a further rotation of the clamping head 18 from the locked position beyond the released position. The handling is thus further enhanced.

In order to enable an accurate alignment with respect to the support base 1, the functional element 5 of the exemplified embodiment is provided with two centering elements 37 which engage into the associated mounting recess 3 in the mounted position. They are located on the lower face of base body 13 extending downwardly. With respect to the longitudinal axis 24, they are positioned radially outside of clamping element 17, whereby they coincide with a connecting line of longitudinal axis 24. In this manner, a diametrically flush arrangement of the centering elements 37 and the clamping head 18 is obtained with respect to the longitudinal axis 24. Hence, it is assured that all these parts can simultaneously immerse into the same mounting recess 3 in the mounted position.

The lateral measurements of the centering element 37 correspond to the width of neck segment 26, so that they can be received with a very low play or free of play in the transverse direction 27.

Basically a single centering element 37 would suffice. However, with larger functional elements 5, it is recommended to have a multitude of centering elements, whereby at least two centering elements 37 should be so arranged that the clamping head 18 is positioned therebetween. This is the case in the exemplified embodiment. There is also the possibility to vary the position of the centering elements 37 with respect to the base body 13, so as to provide different alignments of the functional elements in the mounted position.

In the exemplified embodiment, the centering elements 37 may be adjusted in circumferential direction with respect to the longitudinal axis 24. For this purpose they are arranged in an apertured disk 38 which is arranged rotatably on the lower face of base body 13 in such a manner that its longitudinal axis coincides with the longitudinal axis 24. The central aperture 39 permits the extension therethrough by clamping element 17. The centering elements 37 extend downwardly and position ed diametrically opposite and mounted unitarily on rotating disk 38. By rotating, the alignment with respect to the base body 13 can be changed.

It is advantageous if at least two rotating positions of the rotating disk 38 can be releasably locked with respect to the base body 13.

In the exemplified embodiment, the selectivity consists between a longitudinal position illustrated in FIG. 2 and rotated transverse position thereto having a 90° rotated position. In the longitudinal position, the centering elements 37 are in one row with a longitudinally aligned axis of functional element 5, but in the transverse position are in alignment with a transverse axis. The locking means may be, for example, a yieldingly pretensioned index body 40 which is fixedly co-rotatable on rotating disk 38, and whereby index recesses 43 are formed on base body 13 in the movement path of index body 40 into which the index body 40 is yieldingly pushed in the corresponding rotating positions of rotating disk 38. Naturally, the index body may also be arranged on base body 13, whereby the index recesses 43 are mounted on the rotating disk 38.

In the exemplified embodiment the rotating disk 38 is simply held on base body 13. The retaining means is the actuating element 12 which is provided with downwardly extending holding arms 44 which penetrate the apertures 25 in the edge range in a downward manner. These holding arms 44 also engage aperture 39 and engage behind the aperture edge on the lower face with radially outward extending holding noses 45. Advantageously, a locking connection is provided between the holding noses 45 and the rotating disk 38. The locking device of the rotating disk 38 and the holding arms 44 are so in tune with each other that the actuating element 12 can be rotated without any hindrance without taking along the rotating disk 38. The functions of the actuating element 12 and the rotating disk 38 are completely independent from each other.

From FIG. 3, one can see that the rotating disk 38 is preferably in a lowered position and engages a lower opening recess 46 of base body 13, so that only the centering elements 37 protrude downwardly.

It is also possible to equip a functional element with a multitude of clamping devices of the aforementioned described type which operate independently from each other. It is advantageous, above all, if due to the size of functional element 5, a simultaneous anchoring is meaningful in a multitude of mounting recesses. In particular with relatively large functional elements 5, it may be provided to arrange a multitude of clamping devices in series and at a distance spaced from each other in a longitudinal direction 35.

I claim:

1. A functional component adapted to be releasably secured to a mounting face of a support base, said component comprising:
   a base body, said base body having a lower face adapted for engagement with the mounting face of the support base;
   a clamping device cooperating with said base body and adapted for engagement with the support base whereby said base body is secured to the support base;
   an actuating element for operating said clamping device, said clamping device including a clamping element in mechanical communication with said actuating element, said clamping element defining an axis of rotation extending through said base body and perpendicular to said lower face, said clamping element including a clamping head rotatable about said axis via said actuating element between a released position and a locked position and translatable through a distance along said axis;
   at least one centering element provided on said lower face for positioning said base body on the support base, said centering element located radially outside said axis and adjustable thereabout with respect to said base body.

2. The functional component according to claim 1, wherein said centering element is releasably lockable in at least two positions with respect to said base body.

3. The functional component according to claim 1, wherein said actuating element is a disk-like part rotatably mounted to said base body, said actuating element including a set of female threads; and
   wherein said clamping element includes a set of male threads sized to engage said female threads whereby rotation of said actuating element causes rotation of said clamping head about said axis and translation of said clamping head with respect to said lower face.

4. A functional component adapted to be releasably secured to a mounting face of a support base, said component comprising:
   a base body, said base body having a lower face adapted for engagement with the mounting face of the support base;
   a clamping device cooperating with said base body and adapted for engagement with the support base whereby said base body is secured to the support base;
   an actuating element for operating said clamping device, said clamping device including a clamping element in mechanical communication with said actuating element, said clamping element defining an axis of rotation extending through said base body and perpendicular to said lower face, said clamping element including a clamping head rotatable about said axis via said actuating element between a released position and a locked position and translatable through a distance along said axis;
   at least one centering element provided on said lower face for positioning said base body on the support base;
   an apertured rotating disk rotatably mounted on said lower face and centrally penetrated by said clamping element; and
   wherein said at least one centering element is provided on said disk.

5. The functional component according to claim 4, wherein said base body includes an upper face opposite said lower face and an aperture extending through said base body from said upper face to said lower face; and
   wherein said actuating element is rotatably mounted on said upper face and includes lockable holding arms extending through said aperture and cooperating with said disk to rotatably secure said disk to said lower face.

6. An assembly, comprising:
   i) a support base having a mounting face thereon, said support base including at least one groove-like mounting recess, said recess defining at least one retaining protrusion; and
   ii) a functional component, said functional component including
      a base body, said base body having a lower face for engaging said mounting face of said support base;
      a clamping device cooperating with said base body for securing said base body to said support base;
      an actuating element for operating said clamping device, said clamping device including a clamping element in mechanical communication with said actuating element, said clamping element defining an axis of rotation extending through said base body and perpendicular to said lower face, said clamping element including a clamping head rotatable about said axis via said actuating element between a released position wherein said clamping head is insertable into said mounting recess and a locked position wherein said clamping head is coupled to said mounting recess, said clamping head being translatable along said axis whereby said clamping head is movable between a locked untensioned position wherein said clamping head loosely engages said retaining protrusion and a locked tensioned position wherein said clamping head positively engages said retaining protrusion;
      at least one centering element provided on said lower face for positioning said base body on the support base, said centering element located radially outside said axis and adjustable thereabout with respect to said base body.

7. The assembly according to claim 6, wherein said clamping element further includes rotating limit means for preventing rotation of said clamping head in said mounting recess when said clamping head is in said locked tensioned position.

8. An assembly, comprising:
   i) a support base having a mounting face thereon, said support base including at least one groove-like mounting recess, said recess defining at least one retaining protrusion; and
   ii) a functional component, said functional component including
      a base body, said base body having a lower face for engaging said mounting face of said support base;
      a clamping device cooperating with said base body for securing said base body to said support base;

an actuating element for operating said clamping device, said clamping device including a clamping element in mechanical communication with said actuating element, said clamping element defining an axis of rotation extending through said base body and perpendicular to said lower face, said clamping element including a clamping head rotatable about said axis via said actuating element between a released position wherein said clamping head is insertable into said mounting recess and a locked position wherein said clamping head is coupled to said mounting recess, said clamping head being translatable along said axis whereby said clamping head is movable between a locked untensioned position wherein said clamping head loosely engages said retaining protrusion and a locked tensioned position wherein said clamping head positively engages said retaining protrusion;

at least one centering element provided on said lower face for positioning said base body on the support base;

an apertured rotating disk rotatably mounted on said lower face and centrally penetrates by said clamping element; and wherein said at least one centering element is provided on said disk.

9. The assembly according to claim 8, wherein said clamping element further includes rotating limit means for preventing rotation of said clamping head in said mounting recess when said clamping head is in said locked tensioned position.

* * * * *